United States Patent
Li et al.

(10) Patent No.: US 12,223,304 B2
(45) Date of Patent: Feb. 11, 2025

(54) SYSTEM ADAPTATION METHOD AND APPARATUS, ELECTRONIC DEVICE AND STORAGE MEDIUM

(71) Applicant: SUZHOU METABRAIN INTELLIGENT TECHNOLOGY CO., LTD., Jiangsu (CN)

(72) Inventors: Meiying Li, Jiangsu (CN); Rongxun Jing, Jiangsu (CN); Liangzhan Xing, Jiangsu (CN); Aipeng Lian, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/696,349

(22) PCT Filed: Nov. 30, 2022

(86) PCT No.: PCT/CN2022/135357
§ 371 (c)(1),
(2) Date: Mar. 27, 2024

(87) PCT Pub. No.: WO2023/155536
PCT Pub. Date: Aug. 24, 2023

(65) Prior Publication Data
US 2024/0338191 A1   Oct. 10, 2024

(30) Foreign Application Priority Data
Feb. 17, 2022   (CN) .......................... 202210144060.5

(51) Int. Cl.
*G06F 8/61*   (2018.01)
*G06F 9/455*   (2018.01)

(52) U.S. Cl.
CPC ............ *G06F 8/63* (2013.01); *G06F 9/45558* (2013.01); *G06F 2009/45562* (2013.01)

(58) Field of Classification Search
CPC .................. G06F 8/63; G06F 9/45558; G06F 2009/45562
(Continued)

(56) References Cited

U.S. PATENT DOCUMENTS 7,093,165 B2 *   8/2006   Kageshima ............ G06F 11/362
                                                         714/34
8,261,258 B1     9/2012   Jianu et al.
(Continued)

FOREIGN PATENT DOCUMENTS

CN   106648741 A   5/2017
CN   108847950 A   11/2018
(Continued)

OTHER PUBLICATIONS

Allen, Gabrielle, et al. "The grid application toolkit: toward generic and easy application programming interfaces for the grid." Proceedings of the IEEE 93.3 (2005): pp. 534-550. (Year: 2005).*
(Continued)

*Primary Examiner* — Satish Rampuria
(74) *Attorney, Agent, or Firm* — Cooper Legal Group, LLC

(57) ABSTRACT

A system adaptation method and apparatus, an electronic device and a computer-readable storage medium. The method includes: acquiring a system list and a software list (S101), where the system list includes a target system that needs to be adapted, and the software list includes target software that needs to be adapted; configuring a software installation script corresponding to the target system, and pulling a container system mirror image corresponding to the target system (S102); running, according to the container
(Continued)

system mirror image, a virtualized system environment corresponding to the target system (S103); and downloading the target software to a download directory in a container by using the software installation script (S104).

13 Claims, 3 Drawing Sheets

(58) Field of Classification Search
USPC .................................................. 717/120–178
See application file for complete search history.

(56) References Cited

U.S. PATENT DOCUMENTS

| | | | | |
|---|---|---|---|---|
| 2008/0307414 | A1* | 12/2008 | Alpern | G06F 9/45558 718/1 |
| 2010/0186005 | A1* | 7/2010 | Ike | G06F 11/3696 717/135 |
| 2011/0320599 | A1* | 12/2011 | Matsumoto | G06F 21/305 709/225 |
| 2017/0373957 | A1* | 12/2017 | Mankovskii | H04L 67/34 |
| 2020/0349043 | A1* | 11/2020 | Sugimoto | G06F 9/44505 |
| 2021/0365256 | A1* | 11/2021 | Cadarette | H04L 63/102 |
| 2022/0229644 | A1* | 7/2022 | He | G06F 21/572 |

FOREIGN PATENT DOCUMENTS

| | | |
|---|---|---|
| CN | 110955494 A | 4/2020 |
| CN | 112181588 A | 1/2021 |
| CN | 113238766 A | 8/2021 |
| CN | 114201239 A | 3/2022 |

OTHER PUBLICATIONS

McMillan, Collin, Mark Grechanik, and Denys Poshyvanyk. "Detecting similar software applications." 2012 34th International Conference on Software Engineering (ICSE). IEEE, 2012.pp. 364-374. (Year: 2012).*

Adams, Bram, et al. "Design recovery and maintenance of build systems." 2007 IEEE International Conference on Software Maintenance. IEEE, 2007. pp. 114-123. (Year: 2007).*

Mainetti, Luca, Vincenzo Mighali, and Luigi Patrono. "A software architecture enabling the web of things." IEEE Internet of Things Journal 2.6 (2015): pp. 445-454. (Year: 2015).*

Dolstra, Eelco, Eelco Visser, and Merijn De Jonge. "Imposing a memory management discipline on software deployment." Proceedings. 26th International Conference on Software Engineering. IEEE, 2004.pp. 589-592 (Year: 2004).*

Zhang, Youhui, Gelin Su, and Weiming Zheng. "Converting legacy desktop applications into on-demand personalized software." IEEE Transactions on Services Computing 3.4 (2010): pp. 306-321. (Year: 2010).*

Corresponding International Patent Application No. PCT/CN2022/135357, International Search Report, Date Mailed Feb. 21, 2023.

Corresponding International Patent Application No. PCT/CN2022/135357, Written Opinion, Date Mailed Feb. 21, 2023.

Corresponding Chinese Patent Application No. CN202210144060.5 First Office Action dated Mar. 25, 2022.

Corresponding Chinese Patent Application No. CN202210144060.5 Notice of Grant dated Apr. 8, 2022.

* cited by examiner

SYSTEM ADAPTATION METHOD AND APPARATUS, ELECTRONIC DEVICE AND STORAGE MEDIUM

CROSS-REFERENCE TO RELATED APPLICATION

This application is the national phase application of International Application No. PCT/CN2022/135357, filed Nov. 30, 2022, which claims priority to Chinese Patent Application No. 202210144060.5, entitled "SYSTEM ADAPTATION METHOD AND APPARATUS, ELECTRONIC DEVICE, AND STORAGE MEDIUM", filed with the China National Intellectual Property Administration on Feb. 17, 2022. The contents of International Application No. PCT/CN2022/135357 and Chinese Patent Application No. 202210144060.5 are incorporated herein by reference in their entireties.

FIELD

The present application relates to a system adaptation method and apparatus, an electronic device, and a computer-readable storage medium.

BACKGROUND

With the rapid development and widespread application of an information technology, a Platform as a Service (PaaS) solution is becoming increasingly common. The PaaS provides users with a software research and development platform as a service, so that the users do not need to manage or control a bottom layer, reducing the demand for system management. However, different companies use different server systems. A PaaS product is often only designed, developed, deployed, and tested for a common operating system, making it difficult to deploy and use this product on other systems. For example, if a product is designed for CentOS7.5, this product might be deployed and run on CentOS7.5. However, due to software dependency conflicts and other issues, this product may not be able to be normally deployed and run on CentOS8.0 or other systems. A good PaaS product should be able to satisfy as many customers as possible and should be able to be deployed and run on various operating systems.

In the related technology, for product system adaptation, PaaS products need to be deployed online in a system that needs to be adapted to obtain offline basic software packages that might be installed and run under this system. Networked virtual machines or server systems are mounted; IP addresses are configured; software is installed and saved; and software offline packages are copied. To set up virtual machine, a virtual machine workstation or the like needs to be installed; and a system iso mirror image is then downloaded for mounting and installation. In an installation process, a language, a time zone, a partition, an account password, and the like need to be configured. The inventor realized that the entire process is very slow because lots of human interventions are required. After an operating system is installed, an IP address starts to be configured. A network configuration file needs to be found for modification. An IP address, a gateway, a subnet mask, and the like need to be configured for networking and accessing. A large number of operations are needed, so that the process is time-consuming. To copy the software offline package, the package needs to be copied from a self-built virtual machine or system, which requires a manual operation, and the process is also time-consuming.

SUMMARY

According to various embodiments disclosed in the present application, a system adaptation method and apparatus, an electronic device, and a computer-readable storage medium are provided.

A system adaptation method includes:
acquiring a system list and a software list, wherein the system list includes a target system that needs to be adapted, and the software list includes target software that needs to be adapted;
configuring a software installation script corresponding to the target system, and pulling a container system mirror image corresponding to the target system;
running, according to the container system mirror image, a virtualized system environment corresponding to the target system; and
downloading the target software to a download directory in a container by using the software installation script.

A system adaptation apparatus includes:
an acquisition module, configured for acquiring a system list and a software list, wherein the system list includes a target system that needs to be adapted, and the software list includes target software that needs to be adapted;
a configuration module, configured for: configuring a software installation script corresponding to the target system, and pulling a container system mirror image corresponding to the target system;
a running module, configured for running, according to the container system mirror image, a virtualized system environment corresponding to the target system; and
a downloading module, configured for downloading the target software to a download directory in a container by using the software installation script.

An electronic device includes:
a memory, configured for storing computer-readable instructions;
and one or more processor, configured for executing the computer-readable instructions to implement the steps of the system adaptation method described in any one of the above.

A non-transitory computer-readable storage medium is provided. The computer-readable storage medium stores computer-readable instructions. The computer-readable instructions, when executed by one or more processors, implement the steps of the system adaptation method described in any one of the above.

The details of one or more embodiments of the present application are presented in the accompanying drawings and description below. Other features and advantages of the present application will become apparent from the specification, accompanying drawings, and claims.

BRIEF DESCRIPTION OF THE DRAWINGS

To describe the technical solutions in the embodiments of the present application or in the related art more clearly, the following briefly introduces the accompanying drawings for describing the embodiments or the related art. Apparently, the accompanying drawings in the following description show merely some embodiments of the present application, and a person of ordinary skill in the art may still derive other drawings from the accompanying drawings without creative efforts. The accompanying drawings are intended to provide a further understanding of the present application and constitute a part of this specification. The accompanying drawings and specific implementations below are used together for explaining the present application rather than constituting a limitation on the present application. In the drawings.

DETAILED DESCRIPTION

The technical solutions in the embodiments of the present application are described clearly and completely below with reference to the accompanying drawings in the embodiments of the present application. Apparently, the described embodiments are merely some embodiments of the present application, rather than all of the embodiments. All other embodiments obtained by a person of ordinary skill in the art based on the embodiments of the present application without making creative efforts shall fall within the protection scope of the present application. In addition, in the embodiments of the present application, the terms "first" and "second" are used to distinguish similar objects, but are unnecessarily used to describe a specific sequence or order.

The embodiments of the present application disclose a system adaptation method, which improves the system adaptation efficiency.

Figure 1:
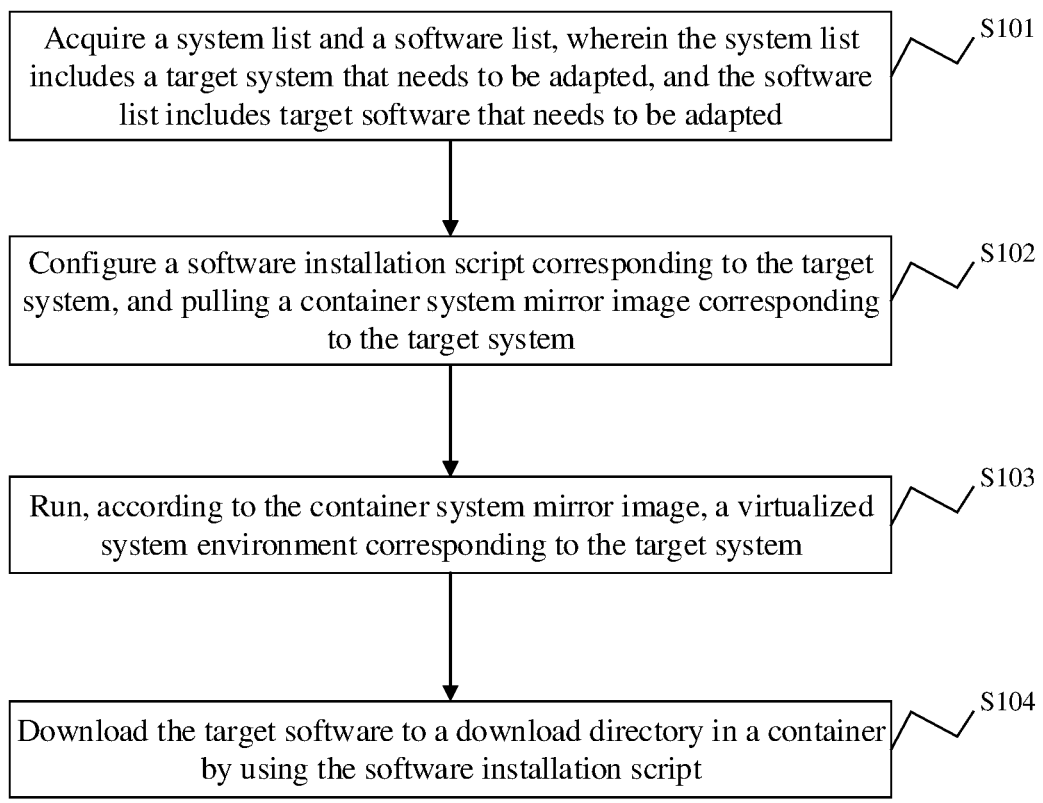
FIG. 1 is a flowchart of a system adaptation method according to one or more embodiments.

FIG. 1 is a flowchart of a system adaptation method according to one or more embodiments. As shown in FIG. 1, the system adaptation method includes:

S101: A system list and a software list are acquired, wherein the system list includes a target system that needs to be adapted, and the software list includes target software that needs to be adapted.

In this step, an OS_list file of the system list that needs to be adapted is configured, which includes the target system that needs to be adapted, such as:

1. centos: 7.5
2. ubuntu: 20.04

Further, the software list software_list that needs to be adapted is configured, which includes the target software that needs to be adapted, such as:

1. pciutils
2. perl
3. net-tools

S102: A software installation script corresponding to the target system is configured, and a container system mirror image corresponding to the target system is pulled.

It might be understood that operation instructions corresponding to different systems. Therefore, in this step, the software installation script corresponding to the target system is configured, which includes a software installation instruction corresponding to the target system. For example, the software installation script corresponding to the centos system includes a yum installation instruction; the software installation script corresponding to the ubuntu system includes an apt-get installation instruction; and the software installation script corresponding to the SUSE system includes a zypper installation instruction. Further, a command line software package manager configuration might be also set to buffer a software package after software installation, without deleting the software package.

Further, after the system list is analyzed, the container system mirror image corresponding to the target system might be pulled by using a docker pull command. For example, cat OS_list|xargs-n 1docker pull might be executed to complete the pulling of different mirror images.

S103: A virtualized system environment corresponding to the target system is run according to the container system mirror image.

In this step, the virtualized system environment corresponding to the target system might be run according to the container system mirror image by using a docker run command. The docker run command might complete the installation and startup of a virtualized system in seconds, and a container shares a network with a host, without additional IP configuration.

S104: The target software is downloaded to a download directory in a container by using the software installation script.

In this step, the target software in the software list is downloaded to the download directory by executing the software installation instruction in the software installation script. All pieces of target software that need to be adapted in containers corresponding to various systems are downloaded and installed once, thus completing the adaptation work of an offline software package.

Further, the download directory might be mounted, which eliminates an operation of copying the offline package from the system. That is, in one or more embodiments, this step includes: A mapping relationship between a host directory and the download directory in the container is mounted, and the software list, the software installation script, and the download directory are mounted: and the target software in the software list is downloaded to the download directory by using the software installation script.

In specific implementation, the mapping relationship between the host directory and the download directory in the container might be mounted by using a −v command, and the software list, the software installation script, and the download directory might be mounted by using the −v command. For example, a container of a centos7.5 might be run through docker run-id-name centos75-v/home/software_list:/home/-v/home/install. sh:/home/-v/home/download_centos75:/home/centos: 7.5/bin/bash/home/install.sh, and software downloading, installation, and adaptation might be completed. After the adaptation ends, the script will copy the buffered offline package to/home/download_centos75. Meanwhile, the adapted offline package will be obtained on the host. That is, the target software is adapted in the host directory according to the mapping relationship.

It might be seen that in this embodiment, only step S101 requires manual configuration, and other steps might be automatically determined and processed by the script.

According to the system adaptation method provided in the embodiments of the present application, operations such as installing a virtual machine or a server system and configuring an IP address are replaced according to a container virtualization technology. In the entire adaptation process, all the adaptation operations might be automatically completed only if a user fills the system list that needs to be adapted and the software list that needs to be adapted, so that the system adaptation efficiency is improved.

It is understood that although all the steps in the flowchart of FIG. 1 are displayed in sequence according to the instructions of the arrows, these steps are not necessarily performed in sequence according to the sequence indicated by the arrows. Unless otherwise explicitly specified in the present application, execution of the steps is not strictly limited, and the steps may be performed in other sequences. Moreover, at least some of the steps in FIG. 1 may include a plurality of substeps or a plurality of stages. These substeps or stages are not necessarily performed at the same moment but may be performed at different moments. Execution of these substeps or stages is not necessarily performed in sequence, but may be performed in turn or alternately with other steps or substeps in other steps or at least some of the stages.

A system adaptation apparatus provided by the embodiments of the present application will be introduced below. The system adaptation apparatus described below might refer to the system adaptation method described above.

Figure 2:
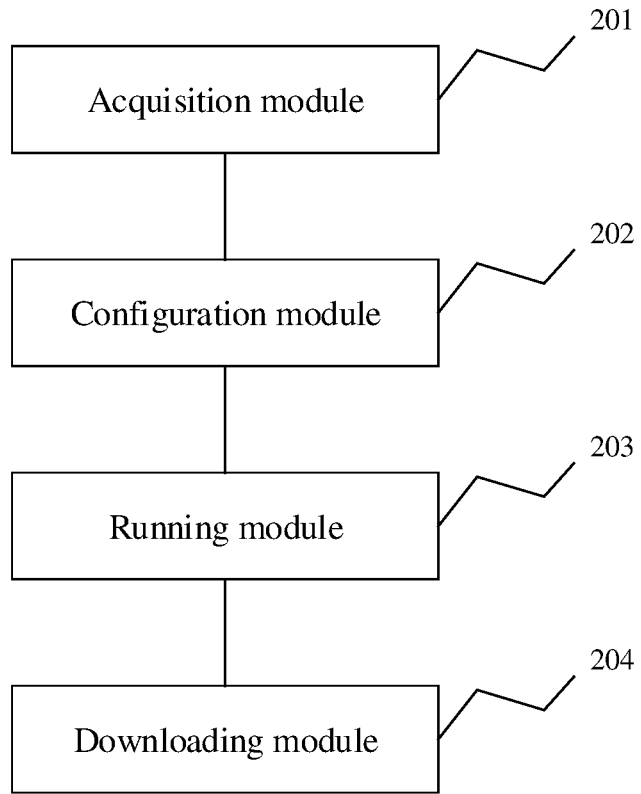
FIG. 2 is a structural diagram of a system adaptation apparatus according to one or more embodiments.

FIG. 2 is a structural diagram of a system adaptation apparatus according to one or more embodiments. As shown in FIG. 2, the system adaptation apparatus includes:
  an acquisition module 201, configured for acquiring a system list and a software list, wherein the system list includes a target system that needs to be adapted, and the software list includes target software that needs to be adapted;
  a configuration module 202, configured for: configuring a software installation script corresponding to the target system, and pulling a container system mirror image corresponding to the target system;
  a running module 203, configured for running, according to the container system mirror image, a virtualized system environment corresponding to the target system; and
  a downloading module 204, configured for downloading the target software to a download directory in a container by using the software installation script.

According to the system adaptation apparatus provided in the embodiments of the present application, operations such as installing a virtual machine or a server system and configuring an IP address is replaced according to a container virtualization technology. In the entire adaptation process, all the adaptation operations might be automatically completed only if a user fills the system list that needs to be adapted and the software list that needs to be adapted, so that the system adaptation efficiency is improved.

In one or more embodiments, the configuration module 202 includes:
  a configuration unit, configured for configuring a software installation script corresponding to the target system; and
  a pulling unit, configured for pulling the container system mirror image corresponding to the target system by using a docker pull command.

In one or more embodiments, the running module 203 is a module for running the virtualized system environment corresponding to the target system according to the container system mirror image by using a docker run command.

In one or more embodiments, the downloading module 204 includes:
  a mounting unit, configured for: mounting a mapping relationship between a host directory and the download directory in the container, and mounting the software list, the software installation script, and the download directory; and
  a downloading unit, configured for downloading the target software in the software list to the download directory by using the software installation script.

In one or more embodiments, the software installation script includes a software installation instruction corresponding to the target system; and the downloading unit is configured for downloading the target software in the software list to the download directory by executing the software installation instruction in the software installation script.

In one or more embodiments, the downloading module 204 further includes:
  an adaptation unit, configured for adapting the target software in the host directory according to the mapping relationship.

In one or more embodiments, the mounting unit is configured for: mounting the mapping relationship between the host directory and the download directory in the container by using a –v command, and mounting the software list, the software installation script, and the download directory by using the –v command.

Regarding the apparatus in the above embodiment, specific manners in which the respective modules perform operations have been described in detail in the embodiments related to the method, and will not be explained in detail here. The specific limitations of the system adaptation apparatus might be found in the limitations on the system adaptation method described above, which will not be elaborated here. All the modules in the system adaptation apparatus may be implemented entirely or partially through software, hardware, or a combination thereof. The above modules might be embedded in or independent of a processor in a computer device in a hardware form or stored in a memory in the computer device in a software form, for the processor to invoke and execute the operations corresponding to the above modules.

Figure 3:
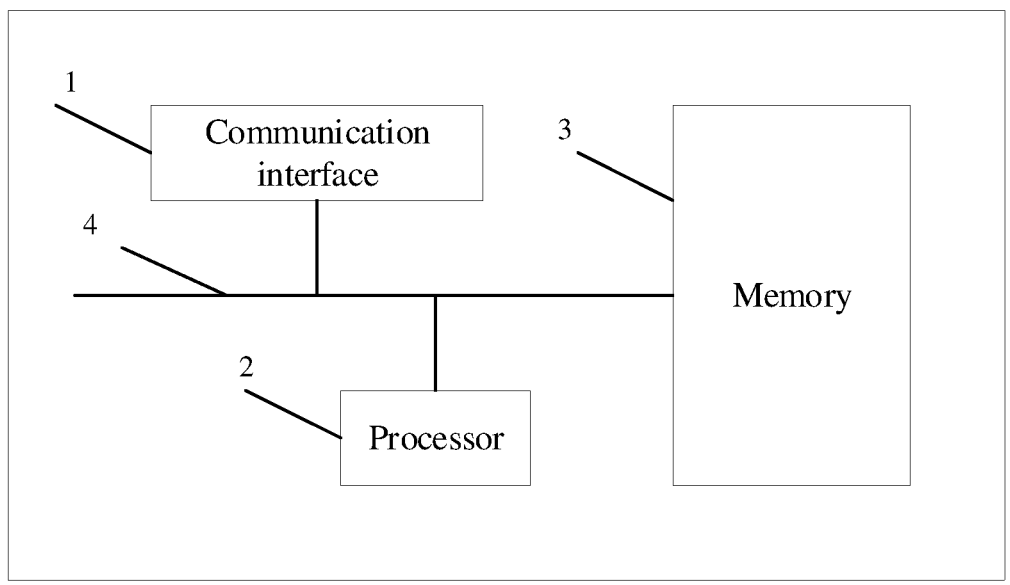
FIG. 3 is a structural diagram of an electronic device according to one or more embodiments.
Figure 4:
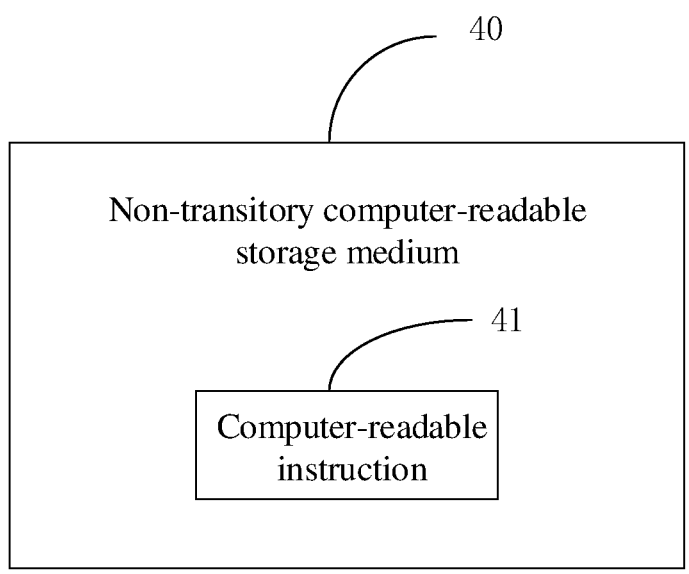
FIG. 4 is a structural diagram of a non-transitory computer-readable storage medium according to one or more embodiments.

Based on the hardware implementation of the above program modules, and in order to implement the method of the embodiments of the present application, the embodiments of the present application further provide an electronic device. FIG. 3 is a structural diagram of an electronic device according to one or more embodiments. As shown in FIG. 3, the electronic device includes:
  a communication interface 1, capable of exchanging information with other devices such as a network device: and
  a processor 2, connected to the communication interface 1 to achieve information exchange with other devices and configured for implementing the system adaptation method provided by one or more of the aforementioned technical solutions when running computer-readable instructions. The computer-readable instructions are stored in a memory 3.

Of course, in practical applications, various components in the electronic device are coupled together through a bus system 4. It might be understood that the bus system 4 is configured for implementing connection and communication between these components. In addition to a data bus, the bus system 4 further includes a power bus, a control bus, and a state signal bus. But, for ease of clear description, all types of buses in FIG. 3 are marked as the bus system 4.

The memory 3 in the embodiments of the present application is configured for storing various types of data to support operations performed on the electronic device. Examples of the data include any computer-readable instructions configured for being operated on the electronic device.

It might be understood that the memory 3 may be a volatile memory or a non-transitory memory, or may include both a volatile memory and a non-transitory memory. The non-transitory memory might be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disc, or a compact disc read-only memory (CD-ROM); and the magnetic surface memory might be either a magnetic disk memory or magnetic tape memory. The volatile memory may be a random-access memory (RAM) serving as an external cache. Through illustrative but not limited description, RAMs in many forms, for example, a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 3 described in the embodiments of the present application aims to include these and any other suitable types of memories.

The above method disclosed in the embodiments of the present application might be applied to the processor 2, or implemented by the processor 2. The processor 2 may be an integrated circuit chip, which has a signal processing capability. In an implementation process, all the steps of the above method might be completed through an integrated logic circuit of hardware in the processor 2 or instructions in the form of software. The above processor 2 may be a general-purpose processor, a digital signal processor (DSP), or another programmable logical device, a discrete gate or transistor logical device, a discrete hardware component, and the like. The processor 2 may implement or perform the methods, steps, and logic block diagrams that are disclosed in the embodiments of the present application. The general-purpose processor may be a microprocessor, any conventional processor, or the like. The steps of the methods disclosed in the embodiments of the present application might be directly performed and completed by a hardware decoding processor, or performed and completed by combining hardware and software modules in a decoding processor. The software modules might be located in a storage medium. The storage medium is located in the memory 3. The processor 2 reads programs in the memory 3 and completes the steps of the above method in combination with the hardware of the processor.

When the processor 2 executes the program, the corresponding processes in each method of the embodiments of the present application are implemented. For simplicity, they will not be elaborated here.

In one or more embodiments, the embodiments of the present application further provide a storage medium, namely, a computer storage medium, a non-transient computer-readable storage medium 40, including, for example, stored computer-readable instructions 41. The above computer-readable instructions 41 may be executed by one or more processors to complete the steps of the system adaptation method of any one or more embodiments described above. The computer-readable storage medium may be an FRAM, a ROM, a PROM, an EPROM, an EEPROM, a flash memory, a magnetic surface memory, an optical disc, a CD-ROM, or the like.

According to the electronic device and the computer-readable storage medium provided in the embodiments of the present application, operations such as installing a virtual machine or a server system and configuring an IP address are replaced according to a container virtualization technology. In the entire adaptation process, all the adaptation operations might be automatically completed only if a user fills the system list that needs to be adapted and the software list that needs to be adapted, so that the system adaptation efficiency is improved.

Persons of ordinary skill in the art might understand that all or some of the steps of the above method embodiment might be implemented through hardware related to programs and instructions. The aforementioned programs might be stored in a computer-readable storage medium. When run, the programs execute the steps included in the above method embodiment. The aforementioned storage medium includes various media that might store program codes, such as a mobile storage device, a ROM, a RAM, a magnetic disc, or an optical disc.

Or, in the present application, when the integrated unit is implemented in the form of a software functional unit and sold or used as an independent product, the integrated unit may also be stored in a computer-readable storage medium. Based on such an understanding, the technical solutions of the embodiments of the present application essentially, or the part contributing to the related technology may be embodied in the form of a software product. The computer software product is stored in a storage medium and includes several instructions for instructing an electronic device (which may be a personal computer, a server, a network device, or the like) to execute all or some of the methods described in the various embodiments of the present application. The aforementioned storage media include: various media that might store program codes, such as a mobile storage device, a ROM, a RAM, a magnetic disc, or an optical disc.

All the technical features of the above embodiments might be combined randomly. For the sake of brevity, all possible combinations of all the technical features in the above embodiments are not described. However, these technical features shall all be considered to fall within the scope of this specification as long as there is no contradiction in their combinations.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A system adaptation method, comprising:
   acquiring a system list and a software list, wherein the system list comprises a target system that needs to be adapted, and the software list comprises target software that needs to be adapted;
   configuring a software installation script corresponding to the target system, and executing a docker pull command to pull a container system mirror image corresponding to the target system;
   executing a docker run command to run a virtualized system environment corresponding to the target system according to the container system mirror image; and
   executing a software installation instruction in the software installation script to download the target software to a download directory in a container;

wherein the executing a software installation instruction in the software installation script to download the target software to a download directory in a container comprises:
mounting a mapping relationship between a host directory and the download directory in the container, and mounting the software list, the software installation script, and the download directory; and
executing the software installation instruction in the software installation script to download the target software to the download directory in the container.

2. The method according to claim 1, wherein the acquiring a system list and a software list comprises:
configuring the system list that needs to be adapted; and
configuring the software list that needs to be adapted.

3. The method according to claim 1, wherein the configuring a software installation script corresponding to the target system comprises:
configuring the software installation instruction comprised in the software installation script corresponding to the target system.

4. The method according to claim 3, wherein the configuring the software installation instruction comprised in the software installation script corresponding to the target system comprises:
in response to the target system being a first system, configuring a yum installation instruction, in response to the target system being a second system, configuring an apt-get installation instruction, and in response to the target system being a third system, configuring a zypper installation instruction.

5. The method according to claim 1, wherein the method further comprises:
setting a command line software package manager configuration to buffer a software package of the target software in response to completion of installation of the target software.

6. The method according to claim 1, wherein after the executing a software installation instruction in the software installation script to download the target software to a download directory in a container, the method further comprises:
adapting the target software in the host directory according to the mapping relationship.

7. The method according to claim 6, wherein the adapting the target software in the host directory according to the mapping relationship comprises:
according to the mapping relationship, copying a buffered offline package of the target software to the host directory, in order for a host to obtain the buffered offline package of the target software after being adapted.

8. The method according to claim 1, wherein the mounting a mapping relationship between a host directory and the download directory in the container, and mounting the software list, the software installation script, and the download directory comprises:
mounting the mapping relationship between the host directory and the download directory in the container by using a -v command, and mounting the software list, the software installation script, and the download directory by using the -v command.

9. An electronic device, comprising:
a memory, configured for storing computer-readable instructions;
one or more processors, configured for executing the computer-readable instructions, and upon execution of the computer-readable instructions, are configured for:
acquiring a system list and a software list, wherein the system list comprises a target system that needs to be adapted, and the software list comprises target software that needs to be adapted;
configuring a software installation script corresponding to the target system, and executing a docker pull command to pull a container system mirror image corresponding to the target system;
executing a docker run command to run a virtualized system environment corresponding to the target system according to the container system mirror image; and
executing a software installation instruction in the software installation script to download the target software to a download directory in a container;
wherein the executing a software installation instruction in the software installation script to download the target software to a download directory in a container comprises:
mounting a mapping relationship between a host directory and the download directory in the container, and mounting the software list, the software installation script, and the download directory; and
executing the software installation instruction in the software installation script to download the target software to the download directory in the container.

10. The electronic device according to claim 9, wherein the one or more processors, upon execution of the computer-readable instructions, are configured for:
during the acquiring a system list and a software list, configuring the system list that needs to be adapted and configuring the software list that needs to be adapted.

11. The electronic device according to claim 9, wherein the one or more processors, upon execution of the computer-readable instructions, are configured for:
during the configuring a software installation script corresponding to the target system, configuring the software installation instruction comprised in the software installation script corresponding to the target system.

12. The electronic device according to claim 9, wherein the one or more processors, upon execution of the computer-readable instructions, are configured for:
setting a command line software package manager configuration to buffer a software package of the target software in response to completion of installation of the target software.

13. One or more non-transitory computer-readable storage media storing computer-readable instructions, wherein the computer-readable instructions, when executed by one or more processors, is configured to cause the one or more processors to perform operations comprising:
acquiring a system list and a software list, wherein the system list comprises a target system that needs to be adapted, and the software list comprises target software that needs to be adapted;
configuring a software installation script corresponding to the target system, and executing a docker pull command to pull a container system mirror image corresponding to the target system;
executing a docker run command to run a virtualized system environment corresponding to the target system according to the container system mirror image; and executing a software installation instruction in the software installation script to download the target software to a download directory in a container;
wherein the executing a software installation instruction in the software installation script to download the target software to a download directory in a container comprises:
  mounting a mapping relationship between a host directory and the download directory in the container, and mounting the software list, the software installation script, and the download directory; and
  executing the software installation instruction in the software installation script to download the target software to the download directory in the container.

* * * * *